May 10, 1966 P. E. AEGIDIUS 3,250,129
APPARATUS FOR TAKING OUT A SAMPLE FROM A FLOW OF MILK
Filed Feb. 18, 1964
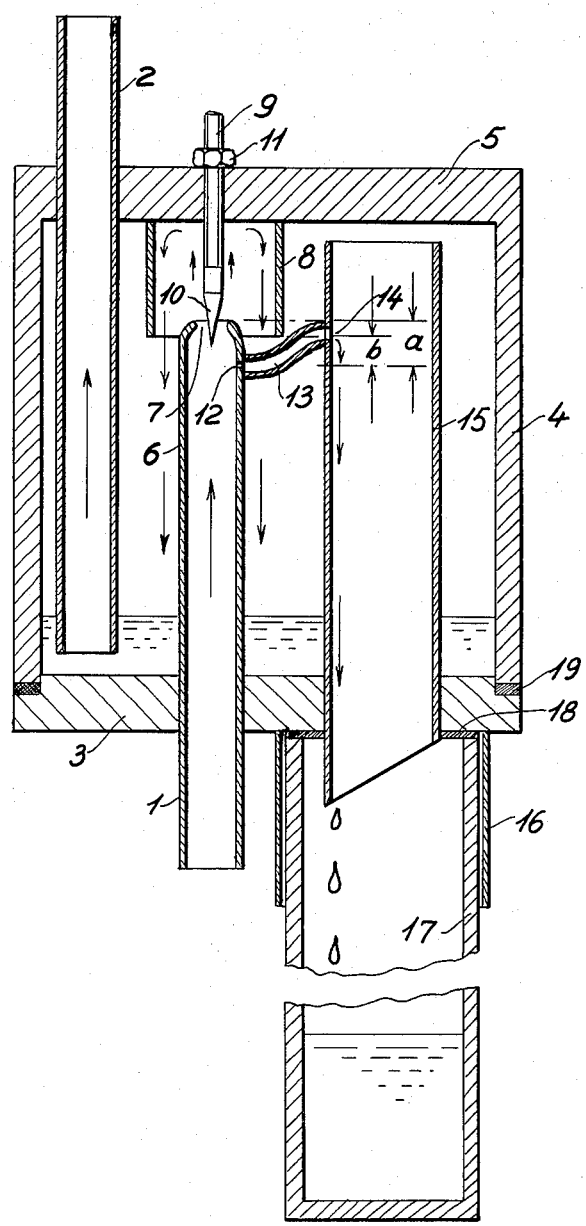
INVENTOR.
Poul E. Aegidius
BY
Watson, Cole, Grindle & Watson
ATTORNEYS

United States Patent Office 3,250,129
Patented May 10, 1966

3,250,129
APPARATUS FOR TAKING OUT A SAMPLE
FROM A FLOW OF MILK
Poul Erik Aegidius, Hillerod, Denmark, assignor to
A/S N. Foss Electric, Hillerod, Denmark
Filed Feb. 18, 1964, Ser. No. 345,649
Claims priority, application Denmark, Oct. 4, 1963, 4,682
5 Claims. (Cl. 73—422)

This invention relates to an apparatus for taking out a sample from a flow of milk, e.g., milk flowing in pipes or tubes of a vacuum milking installation.

More particularly, the invention relates to an apparatus of the type in which a sample is branched off from milk flowing in a conduit under the influence of a hydrodynamic pressure created in the said conduit by the provision of a narrowed zone through which the milk is caused to flow.

The known apparatuses of this type suffer from various drawbacks, which make them less suitable for obtaining an accurate quantitative determination of a flow of milk under the conditions prevailing in many cases where such determination is desired, e.g., in the pipes or other conduits of vacuum milking installations where the milk mostly contains considerable quantities of foam or mixed-up air, and besides the viscosity of the milk may vary within rather wide limits within a relatively short time, such as during the milking of a cow. Besides, in such installations also the speed of flow will vary within wide limits, and the flow conditions on the whole may be rather irregular.

It is an object of the invention to devise an apparatus of the type referred to which is particularly suitable for taking out samples from the flow of milk in a vacuum milking installation over a desired period, e.g., during the milking of a cow.

It is another object of the invention to devise a milk sampling apparatus which is very little affected by the occurrence of air in the milk to be sampled.

A further object of the invention is to devise a milk sampling apparatus by which accurately representative samples, as regards both quantity and quality, may be taken out from the flow of milk in a pipe or other conduit means in a simple and reliable manner.

A still further object of the invention is to provide a milk sampling apparatus in which the influence of the viscosity of the milk on the quantity of milk picked up to form a sample has been substantially eliminated.

A still further object of the invention is to provide a milk sampling apparatus which will permit the taking out of a sample which is, with a high degree of accuracy, proportional to the flow of milk from which it is branched-off even though the milk may be mixed up with air, and the rate of flow may vary within wide limits.

A still further object of the invention is to provide a milk sampling apparatus of the type referred to which is readily adjustable to obtain accuracy of the ratio of sampling quantity to quantity of main flow under all conditions.

A still further object of the invention is to provide a milk sampling apparatus by means of which samples may be taken out in rapid succession with a minimum of intervening operations or waiting time.

A still further object of the invention is to provide a milk sampling apparatus which will permit an accurate sampling without substantially impeding the flow of milk from which the samples are to be taken out.

With these objects in view, in accordance with one aspect of the invention, an apparatus for taking out a sample from a flow of milk comprises a vertical main conduit connectable at one end thereof to a source of milk to be sampled and having a narrowed outlet opening at the other end thereof, means defining a discharge path for milk flowing out of said narrowed outlet opening, a sample receiving compartment isolated from said discharge path while being in pressure equalizing communication with the zone directly outside said narrowed outlet opening, and a sampling conduit branched off from said main conduit and opening into said sample receiving compartment approximately at the level of said narrowed outlet opening.

Further objects and features of the invention will be apparent to those skilled in the art from the following detailed description with reference to the accompanying drawing which diagrammatically shows a vertical section through one form of a milk sampling apparatus according to the invention.

In the drawing, 1 is a tube adapted to be connected to a conduit leading to a teat cup unit of a vacuum milking installation, and 2 is a pipe adapted to be connected to a main transportation conduit for the milk. The tube 1 extends through a bottom cover 3 of a housing 4 and is terminated at some distance from the top wall 5 of the housing with a narrowed outlet opening 7. The pipe 2 extends through the top wall 5 of the housing 4 to a short distance above the bottom cover 3.

The upper end of the tube 1 is surrounded at some distance therefrom by a shield 8 which is attached to the inner face of the top wall 5 of the housing. An adjustment screw 9 is threadedly engaged in a bore of the top wall 5 and is constructed at its lower end with a cone extending into the narrowed opening 7. 11 is a counter nut serving to lock the adjustment screw in the position in which it has been set.

Immediately below the narrowed opening 7, the wall of the tube 1 has a lateral hole 12 to which one end of a branch-off passage is connected, the other end of said branch-off passage opening through a hole 14 into an upwardly open pipe 15 extending through the bottom cover 3.

Around the downwardly projecting end of the tube 15, the bottom cover 3 carries a socket 16 for receiving the upper end of a sampling tube 17 which is held in the position shown in the drawing by spring locking means not illustrated. A sealing ring 18 is provided between the bottom face of the cover 3 and the top edge of the sampling tube. A sealing member 19 is also provided between the bottom cover 3 and the wall of the housing 4.

One end of the branch-off passage 13 is connected to the tube 1, in the following to be referred to as the main conduit at a level $a$ below the open end 7 of the main conduit, and the other end of the branch-off passage is connected to the tube 15 at a level $b$ above the first mentioned end of the branch-off passage. For reasons to be explained below, $b$ should preferably be somewhat less than $a$.

During use of the apparatus, a mixture of milk and air is supplied to the tube 1 from the teat cup unit, to which it is connected, and this mixture flows out through the narrowed opening 7 and down to the bottom of the housing from which it is discharged through the pipe 2. The shield 8 prevents milk flowing out of the opening 7 from proceeding to the upper end of the tube 15 and from there to the sampling tube 17. On the other hand, during flow of the mixture of milk and air through the main conduit 6, a fraction of the flow is branched off through the branch-off passage 13 to the tube 15 and from there to the sampling tube 17. This branching-off takes place as a consequence of the flow conditions in the apparatus.

The function of the apparatus illustrated will most readily be understood by first examining what happens if a liquid of low viscosity and with no mixed up air is passed through the apparatus. Assuming that laminar flow conditions prevail in the main conduit 6, the pressure difference between a point at the level of the opening 12 and a point in the zone of the hole 7 will be equal to the static pressure of a liquid column of the height $a$ plus a dynamic pressure component which is proportional to the difference between the square value of the velocity in the opening 7 and the square value of the velocity at the level of the hole 12, and thus proportional to the square value of the velocity in the main conduit. Since the opening 7 is in free pressure equalizing communication with the tube 15 through the interior of the housing 4, the same pressure prevails in the opening 7 as in the tube 15 and thus in the zone of the hole 14. Consequently, the above mentioned pressure difference also prevails between the ends of the branch-off passage 13. At the left hand end of the branch-off passage directly outside the opening 12, the pressure is equal to the pressure in the tube 15 minus the static pressure of a liquid column of the height $b$. If $a$ is equal to $b$, the pressure difference prevailing across the opening 12 is consequently proportional to the square value of the velocity of flow in the main conduit. This is the pressure difference urging liquid through the opening 12.

According to Torricelli's law, the quqaqntity of liquid flowing through a narrow hole per time unit is proportional to the square root value of the pressure difference across the hole.

The quantity of liquid flowing through the hole 12 per second is therefore proportional to the velocity of flow of the liquid in the main conduit 6 and thus proportional to the total quantity of liquid flowing through the main conduit per second. It will therefore be understood that the quantity of liquid collected in the sampling tube 13 on completion of the test is proportional to the total quantity of liquid that has passed through the main conduit 6, irrespective of variations of the velocity of the liquid in the main conduit 6, so that the apparatus constitutes a meter of quantity.

The hydrodynamic laws referred to are applicable as long as the flow is laminar and frictionless. These conditions are fulfilled with good approximation because there is a uniform transition from the inner cross section of the main conduit 1 to the narrowed opening 7 and because the lengths of the openings 7 and 12 do not exceed the diameters of the passage areas of these openings.

As mentioned above, the static pressure will not give any contribution to the branched-off sampling quantity, if the differences of level $a$ and $b$ are equal. However, considering now the practical operating conditions where the milk to be sampled contains foam or mixed-up air, the hole 12 and the branched-off passage 13 will offer a somewhat greater resistance to the flow of the liquid than would be the case if there were no foam in the liquid. The surface tension of the liquid also tends to impede the flow. To reduce the effect of the surface tension, the inner face of the tube 15 is made absolutely smooth in the zone of the opening of the branch-off passage 13, but in spite of this, the surface tension is capable of effecting a small reduction of the sampling quantity flowing through the branch-off passage 13, as compared with the theoretical value. To compensate for the influence of foam in the sample, and of the surface tension of the liquid, both of which factors will effect reductions of the sampling quantity which are practically constant and independent of the speed of flow of the milk, the level difference $b$ is made somewhat less than the level difference $a$, so that a relatively constant factor of proportionality is obtained between the total quantity of liquid flowing through the main conduit and the sampling quantity flowing through the branch-off conduit, even at relatively low velocities. The explanation of this is that by selecting $b$ somewhat less than $a$, a static pressure, viz. a pressure proportional to the difference between $a$ and $b$ will be effective in the direction of flow of the branched-off liquid in addition to the above mentioned pressure difference proportional to the square value of the velocity in the main conduit. It is to be observed, however, that the difference between $a$ and $b$ is in practice very small, so that the opening 14 may be said to be located approximately at the level of the opening 7.

It has been explained above how proportionality is obtained when considering a liquid of low viscosity and not containing mixed up air. However, in practice considerable quantities of air will be present in the milk, but owing to the vertical disposition of the main conduit 1, the mixture of milk and air flowing upwards through same will be separated so that the milk will pass through the main conduit 1 in the form of coherent bodies or "plugs" separated by air. Now, the hole 12 is located so close to the outlet opening 7 that when a "milk plug" passes through the outlet opening, the dynamic pressure thereby produced will urge a proportional quantity through the branch-off passage 13. When a quantity of air comes after the milk, a dynamic pressure difference will likewise be produced in the air by the narrowed outlet opening, so that a quantity of air will be urged through the branch-off passage 13, but this gives no contribution to the milk sample. If, on the other hand, the difference of level between the narrowed opening 7 and the branch-off passage opening 12 were relatively great, it might occur that milk would be present in the zone of the opening 12 while air was flowing through the outlet opening 7 whereby the proportionality would be disturbed. Similarly, if the main conduit 1 were horizontally disposed, the air would tend to collect at the top, and the milk at the bottom of the cross section of the conduit, so that it would be impossible to obtain any degree of approximation to simultaneity of the presence of liquid in the two openings.

It is to be observed, however, that the hole 12 should not be provided so close to the smallest cross section of the narrowed outlet opening 7 that the non-uniform flow conditions in and around the smallest cross-section of the narrowed outlet opening may give rise to errors in the sampling.

The viscosity of the milk depends on the fat percentage, fat milk being more viscose than meagre milk. However, the influence of the viscosity may be compensated for by suitably selecting the relative areas of the outlet opening 7 and the lateral hole 12. If the area of the lateral hole 12 is too small in relation to that of the outlet opening, the quantity of the sample will be too small when the viscosity of the milk is high and too great when the viscosity of the milk is low.

When the viscosity of the milk increases, the pressure in the milk in the zone of the opening 12 will also increase on account of the increased resistance at the narrowed outlet opening. The resistance to the flow of the sample through the opening 12 will also increase with increasing viscosity. In the example illustrated, the ratio of the area of the narrowed outlet opening 7 to that of the opening 12 is about 40, whereby the two factors referred to balance each other so that the sampling quantity becomes independent of the viscosity.

It has previously been mentioned that the pressure in the main conduit 6, when disregarding the static pressure, is proportional to the square value of the velocity of the liquid. Besides, the value of the pressure, or in other words the factor of proportionality also depends on the area of the narrowed outlet opening in accordance with the hydrodynamic laws. In order to obtain the best possible proportionality between the sampling quantity and the quantity of the liquid flowing through the main conduit 6 at low velocities, the area of the narrowed outlet opening 7 should be as small as possible. However, the area should not be so small that the apparatus reduces the milking speed by offering a too high resistance to the passage of the milk. In practice, this means that the diameter of the narrowed outlet opening 7 should not be too much less than the inner diameter of the main conduit. To maintain the ratio of areas mentioned above it is found that the hole 12 should be made very small. Since the hole of such small diameter can only be bored at a tolerance of about 5%, it wll be understood that there will be a variation from apparatus to apparatus as regards the proportion of the branched-off flow to the main flow. However, by means of the adjustment screw 9, the area of the narrowed outlet opening 7 may be adjusted in such a manner as to obtain the correct ratio of this area to that of the hole 12 so that all apparatuses will have the same factor of proportionality.

In use of the apparatus, when milking of a cow has been completed, the sampling glass 17 is removed and a new glass is introduced into the socket 16 before milking of the next cow is commenced. Thus, it is not necessary to wait for any foam formed in the sampling glass to collapse before starting the milking of the next cow. The sampling glass is provided with a scale, which is calibrated in accordance with the factor of proportionality of the apparatus, so that the quantity of liquid that has passed through the apparatus can be directly read on the scale.

I claim:

1. An apparatus for taking out a sample from a flow of milk, comprising a closed housing, a tube extending vertically upwards from the bottom of said housing towards the top thereof, said tube being connectable at the lower end thereof to a source of milk to be sampled and having a narrowed outlet opening at the upper end thereof and a narrow branch-off passage opening in the wall thereof, at a short distance below said narrowed outlet opening, shielding means surrounding the upper end of said tube, means for discharging milk from the bottom of said housing, a separate sample receiving compartment in open communication at the top thereof with the interior of said housing, and conduit means of larger diameter than said passage opening connecting the latter with a zone of said sample receiving compartment at a level between the level of said narrowed outlet opening and the level of said branch-off passage opening.

2. An apparatus as in claim 1 in which the proportion of the cross sectional area of said narrowed outlet opening to that of said narrow branch-off passage opening is about 40.

3. An apparatus for taking out a sample from a flow of milk, comprising a closed housing, a vertical main conduit extending into said housing from the exterior thereof, said main conduit being connectable at the outer end thereof to a source of milk to be sampled and being constructed at its other end with a narrowed outlet portion opening directly into said closed housing, a discharge conduit for milk opening into the interior of said housing adjacent the bottom thereof, a sample receiving compartment in pressure equalizing communication with the interior of said housing but isolated from the path of milk from said narrowed outlet portion to said discharge conduit, a sampling conduit branched off from said main conduit at a distance behind the opening of said narrowed outlet portion of the same order of size as the diameter of said main conduit, said sampling conduit being sealed from the atmosphere and opening into said sample receiving compartment approximately at the level of the opening of said narrowed outlet portion.

4. An apparatus as in claim 3 in which said sampling conduit comprises a passage opening of reduced cross section with respect to that of the remainder of said sampling conduit, and in which the proportion of the cross-sectional area of said narrowed outlet opening to that of said reduced passage opening is about 40.

5. An apparatus as in claim 3 and further comprising a throttling cone mounted for co-operation with said narrowed outlet opening and being axially adjustable with respect thereto.

References Cited by the Examiner

UNITED STATES PATENTS

| | | | |
|---|---|---|---|
| 2,608,098 | 8/1952 | Paulson | 73—422 |
| 2,858,697 | 11/1958 | Entwistle | 73—203 |
| 3,174,345 | 3/1965 | Bodmin | 73—422 |

LOUIS R. PRINCE, *Primary Examiner.*

S. CLEMENT SWISHER, *Assistant Examiner.*